(No Model.)
B. BEAUPRE.
ROLLER JOURNAL BEARING.
No. 533,983. Patented Feb. 12, 1895.
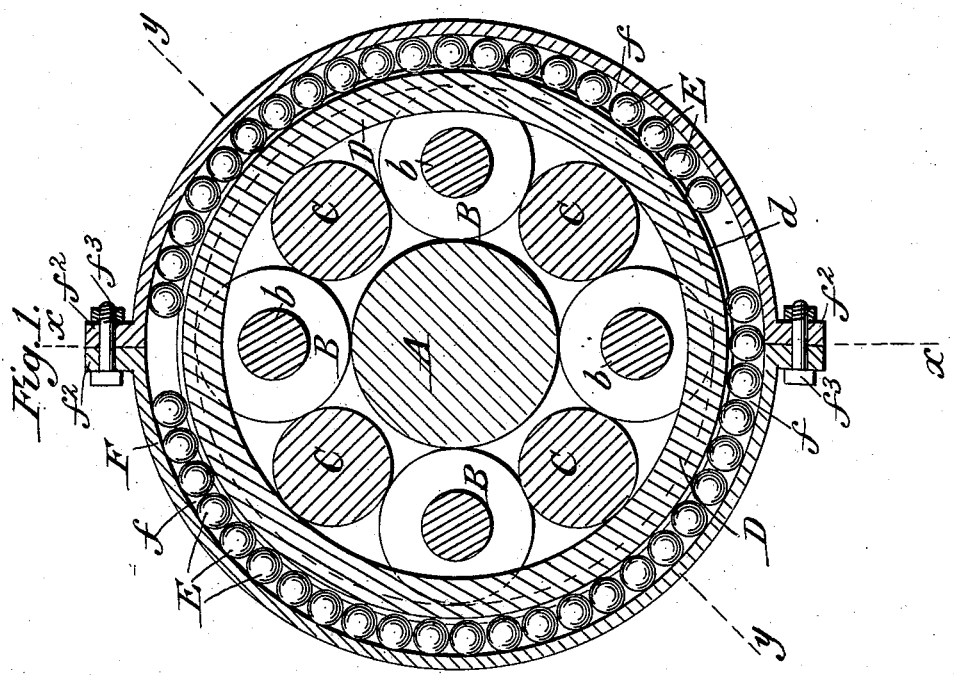
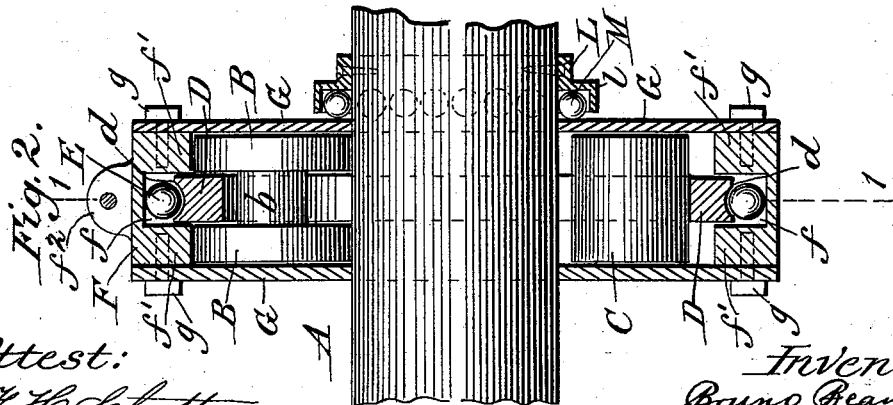
Attest:
F. H. Schott
M. C. Massie.
Inventor
Bruno Beaupre
by Louis Feeser
Attorney.

UNITED STATES PATENT OFFICE.

BRUNO BEAUPRE, OF ST. PAUL, MINNESOTA, ASSIGNOR TO MARGURAT AMELIA BEAUPRÉ, OF SAME PLACE.

ROLLER JOURNAL-BEARING.

SPECIFICATION forming part of Letters Patent No. 533,983, dated February 12, 1895.

Application filed April 5, 1894. Serial No. 506,372. (No model.)

*To all whom it may concern:*

Be it known that I, BRUNO BEAUPRE, a citizen of the United States, residing at St. Paul, in the county of Ramsey and State of Minnesota, have invented certain new and useful Improvements in Roller Journal-Bearings; and I do hereby declare that the following is a full, clear, and exact description of the invention, such as will enable those skilled in the art to which it appertains to make and use the same.

My invention relates to improvements in roller journal-bearings.

The invention consists of such features, details of construction, and combinations of parts, as will first be described in connection with the accompanying drawings, and then particularly pointed out in the claim.

In the drawings—Figure 1 is a vertical, central, sectional view of a bearing embodying my invention, taken on the line 1—1, Fig. 2. Fig. 2 is a compound section, the upper half being taken on the line $x$—$x$, and the lower half on the line $y$—$y$, Fig. 1.

Referring to the drawings,—A is a shaft which is surrounded by bearing-rollers, B, whose central portions are of reduced diameter, as shown at $b$. These bearing-rollers are separated by separating-rollers, C, of smaller diameter than the largest portion of the bearing-rollers. The separating-rollers, C, are all surrounded by, and bear against, an inclosing ring, D, which has a grooved periphery, as shown at $d$. The inclosing-ring, D, is surrounded by a series of anti-friction balls, E, which contact with the grooved portion, $d$, of the ring, D, and are located in an internal groove, $f$, of an outer ring, F, whose sides, $f'$, extend inward a sufficient distance to hold the inclosing-ring, D, against undue lateral displacement, and to contact with the peripheries of the enlarged portions of the bearing-rollers, B. The outer ring, F, is preferably made in two sections, provided with flanges, $f^2$, these sections being held together by bolts, $f^3$, passing through the flanges, as shown.

It is obvious that, in applying my invention to a bearing where the shaft, A, revolves, the outer ring, F, is stationary, and is carried by any suitable part of the framework of the machinery, whereas, if the shaft is stationary, the ring, F, forms a part of the moving portion of the machine, and revolves around the shaft, A. This will be plain to those skilled in the art.

In order to hold the bearing and separating-rollers in place, and to exclude dirt from the bearing, a pair of end-plates, G, are provided, these plates being attached to the outer ring, by screws, $g$, as will be plain from the drawings.

To the shaft, A, is fixed a collar, L, having a flange, $l$, which forms an annular compartment in which is placed a series of balls, M, which bear against the end-plates, G, thus serving to resist any end-thrust on the bearing, it being understood that the collar, L, and balls, M, may be placed on the side of either end-plate, as may be desired, according to the direction of thrust of the shaft.

Having thus fully described my invention, what I claim as new, and desire to secure by Letters Patent, is—

In a roller journal bearing, the combination, with a shaft and a series of bearing rollers around the shaft, each having a central reduced portion, of a series of separating rollers arranged alternately between the bearing rollers, an outer ring on which the bearing rollers move, the said outer ring having a central internal groove, a series of antifriction balls located in the groove, the diameter of said balls being less than the depth of the groove, and an inner ring resting on the said balls and contacting with the separating rollers, substantially as set forth.

In testimony whereof I have hereunto set my hand in presence of two subscribing witnesses.

BRUNO BEAUPRE.

Witnesses:
B. WISEHHUNSEN,
AIRE H. VOORWINDEN.